May 30, 1967
R. B. CRONHEIM
3,322,075
ICE CREAM DIPPERS
Filed Jan. 15, 1965
4 Sheets-Sheet 1
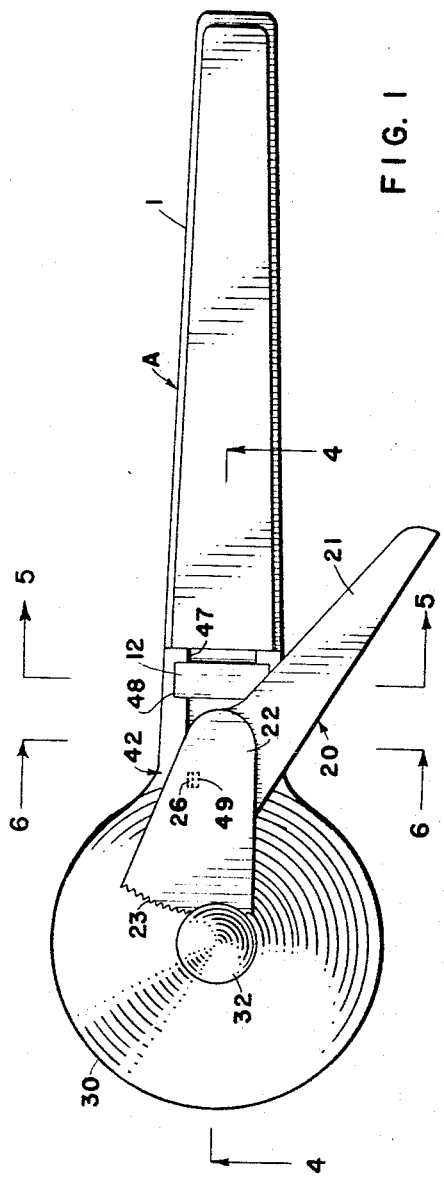
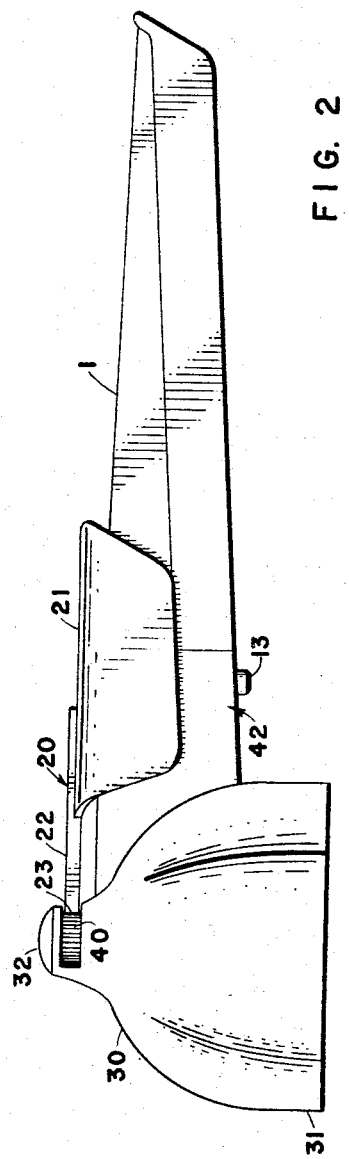
INVENTOR.
RICHARD B. CRONHEIM
BY
*Alfred W. Petchaft*
ATTORNEY May 30, 1967  R. B. CRONHEIM  3,322,075
ICE CREAM DIPPERS Filed Jan. 15, 1965  4 Sheets-Sheet 2

INVENTOR.
RICHARD B. CRONHEIM
BY
*Alfred W. Petchaft*
ATTORNEY ns Patent Office 3,322,075
Patented May 30, 1967

3,322,075
ICE CREAM DIPPERS
Richard B. Cronheim, 411 N. 7th St.,
St. Louis, Mo. 63101
Filed Jan. 15, 1965, Ser. No. 425,901
6 Claims. (Cl. 107—48)

This invention relates in general to new and useful improvements in hand operated devices for dispensing table portions of foods prepared in bulk quantities, and, more particularly, to an ice cream dipper-set capable of dispensing quantities of ice cream having different sizes and configurations.

Present ice cream dippers usually consist of a hollow hemispherical scoop, a handle permanently attached thereto, a semi-circular dipper blade pivoted along a diameter of the circular opening of the hemispherical scoop, and an actuating lever operatively attached to the dipper blade. The dipper blade sweeps along the inner face of the hemisphere, and when the inner face thereof is filled with a quantity of ice cream, the sweep of the blade will dislodge a hemispherically shaped portion of ice cream therefrom. Conventional ice cream dippers are capable of dispensing ice cream in only one configuration, namely, a hemisphere, and, therefore, have limitations as to size of portion and decorative shape. Further, conventional dippers often become difficult to operate, especially when the ice cream is solidly frozen.

It is, therefore, the primary object of the present invention to provide an ice cream dipper, including in combination, an operating handle and a plurality of interchangeable scoops which afford the user great flexibility and choice as to size of portion to be dispensed and the decorative shape thereof.

It is another object of the present invention to provide an ice cream dipper set of the type stated which is easy to manipulate and in which the several scoops can be readily interchanged.

It is an additional object of the present invention to provide an ice cream dipper which is light in weight, is compact in size, is rigid in construction, and can withstand considerable abuse.

With the above objects in view, my invention resides in the novel features of form, construction, arrangement, and, combination of parts presently described and pointed out in the claims.

In the accompanying drawings (4 sheets)—

FIG. 1 is a top plan view of an ice cream dipper constructed in accordance with and embodying the present invention;

FIG. 2 is a side elevational view of an ice cream dipper constructed in accordance with and embodying the present invention;

Figure 3:
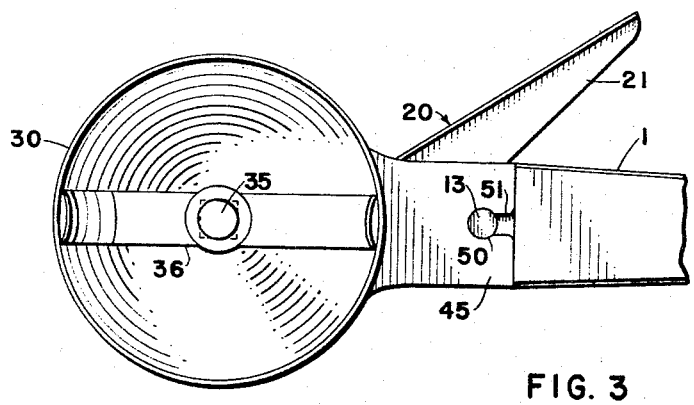
FIG. 3 is a fragmentary bottom plan view of an ice cream dipper constructed in accordance with and embodying the present invention.
Figure 4:
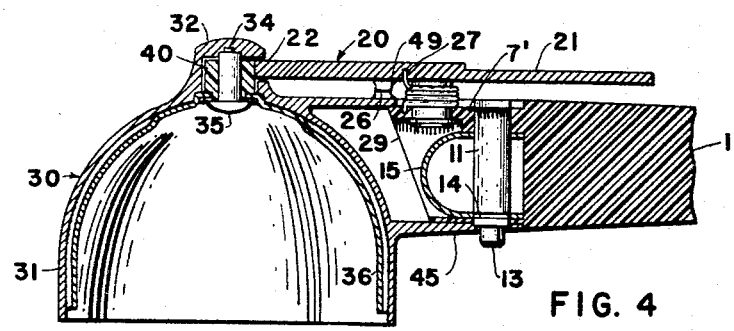
Figure 5:
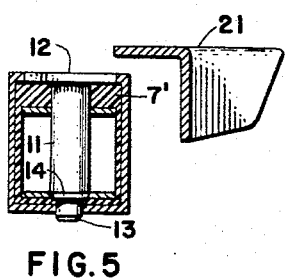
Figure 6:
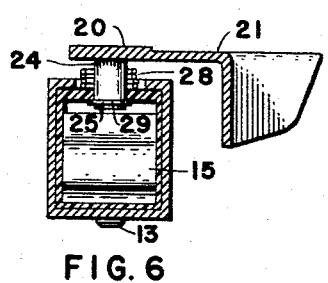
Figure 7:
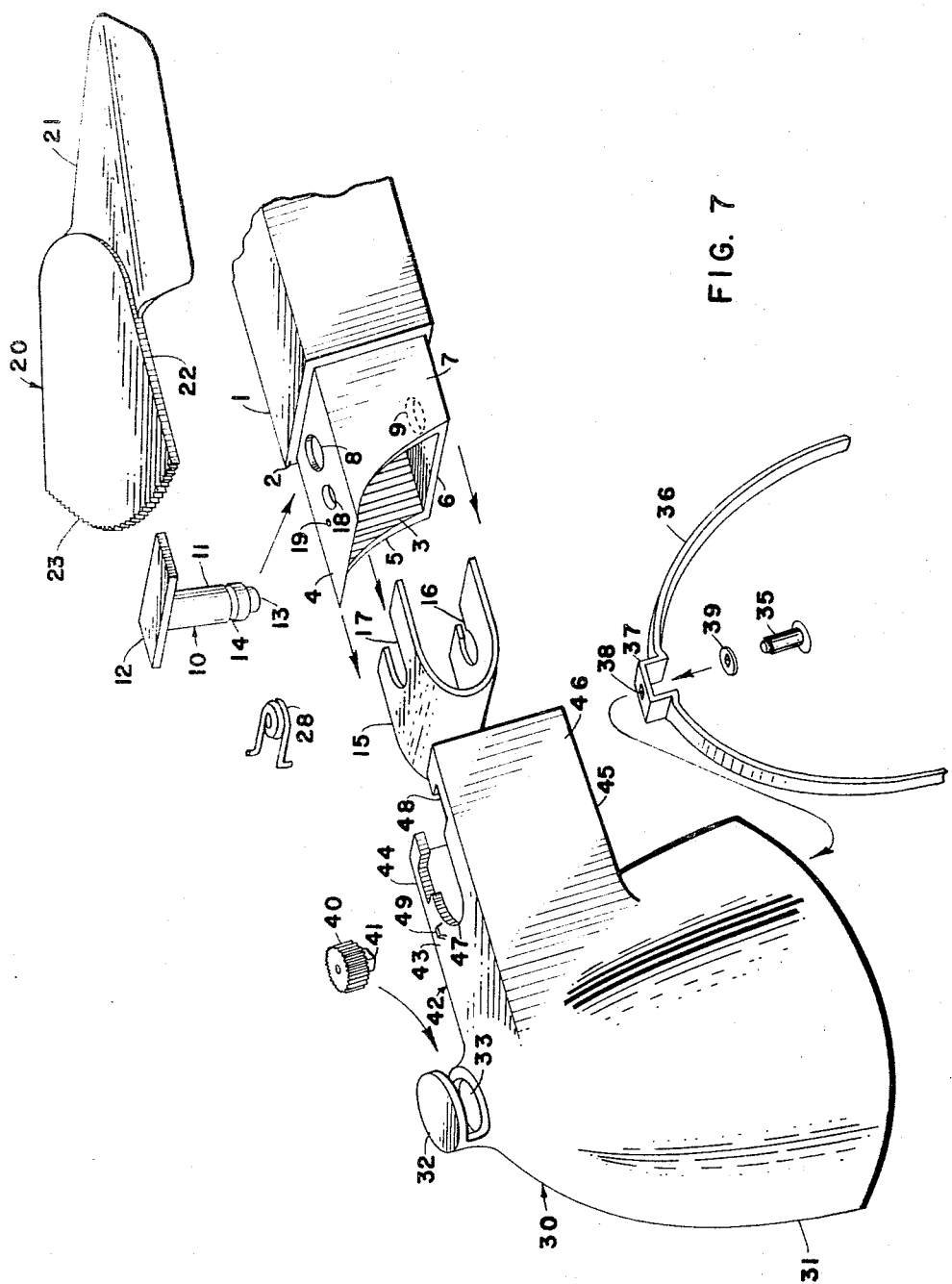
Figure 8:
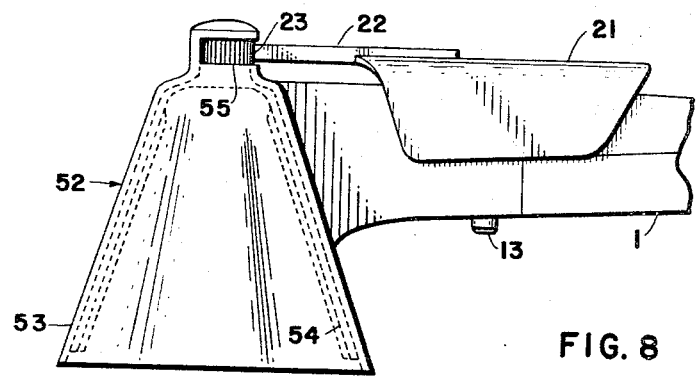
Figure 9:
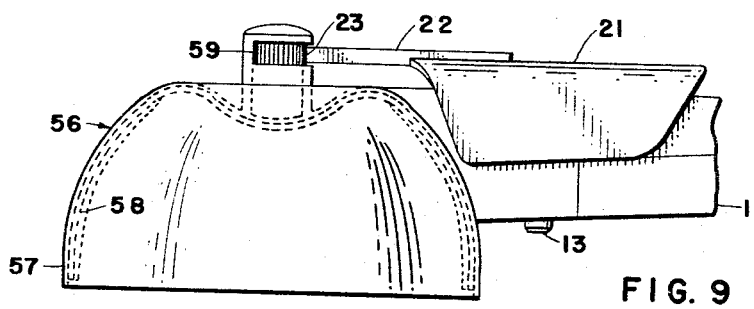

FIGS. 4, 5, and 6 are fragmentary sectional views taken along lines 4—4, 5—5, and 6—6, respectively, of FIG. 1;

FIG. 7 is a fragmentary exploded perspective view of an ice cream dipper constructed in accordance with and embodying the present invention;

FIG. 8 is a elevational view of a second form of ice cream scoop forming part of the set, with a portion of the handle being attached thereo; and FIG. 9 is an elevational view of a third form of ice cream scoop forming part of the set with a portion of the handle being attached thereto.

Referring now in more detail and by reference characters to the drawings, which illustrate practical embodiments of the present invention, A designates an ice cream dipper having a handle or grip 1, which is constructed from styrene plastic or other suitable material. Projecting longitudinally from one end of handle 1 at shoulder 2 is hollow boss 3. Boss 3 is substantially square in cross section and has four walls, 4, 5, 6, and 7. The inwardly presented face of wall 4 is stepped in the provision of a ledge 7' for purposes presently more fully appearing. Walls 4 and 6 of boss 3 are respectively provided with axially aligned apertures 8 and 9. Operatively disposed within apertures 8 and 9, as best illustrated in FIG. 4, is locking member 10 comprising an elongated rod-like cylindrical shank 11 rigidly provided at one end with a rectilinear locking plate 12 and being diametrically reduced at its other end in the formation of an axially projecting button 13. When locking member 10 is disposed within apertures 8 and 9, shank 11 will protrude slightly beyond the outwardly presented face of wall 6, while annular groove 14, which is formed in shank 11, will be positioned slightly above the inwardly presented face of wall 6.

Resilient stainless steel U-shaped spring 15 is provided at its ends with relatively deep U-shaped notches 16 and 17. Notch 16 is sized for snug engagement with groove 14, while notch 17 is sized to clear and fit around shank 11. Spring 15 is operatively positioned in boss 3 in such a manner that notch 16 will engage groove 14 while the opposite end of the spring will abut against ledge 7'. Spring 15 thus biases locking plate 12 against the outwardly presented face of wall 4. As best illustrated in FIG. 7, wall 4 of boss 3 is further provided with apertures 18 and 19 for purposes presently more fully appearing.

Provided for operative association with handle 1 is flipper assembly 20 integrally including actuating lever 21 and spur gear sector 22 having gear teeth 23 formed thereon. Cylindrical shaft 24 projects downwardly from spur gear sector 22 and is provided near its outer end with annular groove 25. Spur gear sector 22 further includes stop 26 and is bored in close proximity to shaft 24 in the provision of aperture 27 to accommodate one end of spiral spring 28 which fits around shaft 24. Shaft 24 of flipper assembly 20 is then inserted in aperture 18 while the opposite end of spring 28 is inserted in aperture 19. Split washer 29 engages groove 25 in shaft 24, thereby securing the flipper assembly 20 rotatably on boss 3.

Provided for operative association with handle 1 is scoop 30. Scoop 30 includes a hemispherical cup 31 which is provided with pinion gear housing 32, as best illustrated in FIG. 7. The inwardly presented face of cup 31 is bored in the provision of an aperture 33 which communicates with the interior of pinion gear housing 32, while the interior wall of pinion gear housing 32 is bored with axially aligned hole 34. Hole 34 snugly receives shaft pin 35, which is pressed therein and extends into aperture 33.

Rotatably mounted on and retained within cup 31 by shaft pin 35 is semi-circular dipper blade 36 which possesses an arcuate cross section to give rigidity thereto and has an outer radius equal to the inner radius of cup 31. An upstanding boss 37 projects from the center of blade 36. Upstanding boss 37 fits within aperture 33 and is provided with a square shaped aperture 38. Washer 39 separates the head of shaft pin 35 from the boss 37.

Rotatably mounted on shaft pin 35 within pinion gear housing 32 is nylon pinion gear 40. Square shaped boss 41 is formed integral thereto and extends from one end surface thereof for snug fitting engagement with aperture 38 of dipper blade. Thus, dipper blade 36 and pinion gear 40, while being free to rotate on shaft pin 35, are positively locked one to the other.

Channel 42 projects substantially radially from cup 31 and is internally sized to telescopically fit over boss 3 and abut against shoulder 2. Channel 42 includes walls 43, 44, 45, and 46 which abut against walls 4, 5, 6, and 7, respectively, of boss 3. Wall 43 is provided with U-shaped notch 47 which permits channel 42 to clear shaft 24 and spring 28. Indentations 48 extend laterally from notch 47 and are sized and positioned to snugly engage plate 12 of locking member 9. Flipper stop boss 49 extends outwardly from wall 43 for purposes presently more fully appearing.

Wall 45 is provided with circular aperture 50, and extending radially therefrom and parallel to the longitudinal axis of channel 42, is elongated groove 51 which is slightly wider than the radius of button 13.

Thus, when channel 42 is inserted over boss 3 and button 13 is depressed, one may slide channel 42 completely over boss 3 and into abutment with shoulder 2. Contemporaneously therewith, teeth 23 of spur gear sector 22 will mesh with the teeth of pinion gear 40. Upon release of button 13 shank 11 will engage aperture 49 while plate 12 will engage indentations 48, thereby firmly locking scoop 30 to handle 1. Spring 28 will bias flipper stop 27 on flipper assembly 20 against boss 49 and thereby prevent further rotation of flipper assembly 20. By pressing actuating lever 21 toward handle 1 one will cause spur gear sector 22 to rotate about its axis which is shaft 24. Spur gear sector 22 will, of course, rotate pinion gear 40 and with it dipper blade 36. In this respect, pinion gear 40 should have generally about half as many teeth as spur gear sector 22, so as to permit the blade 36 to rotate approximately 180 degrees. The sweep of dipper blade 36 will separate any ice cream in cup 31 from the wall thereof and will dispense ice cream in an attractive portion.

It is possible to provide a second form of scoop substantially as shown in FIG. 8. Scoop 52 is similiar to scoop 30 and is adapted to fit over and lock on boss 3 in a manner identical to that of scoop 30. Thus, scoop 52 is interchangeable with scoop 30. Scoop 52, however, is provided with a cup 53 which is shaped in the form of a truncated cone. Dipper blade 54 is secured to pinion gear 55 and is adapted to operatively fit within cup 53 and upon rotation sweep the inner surface thereof. Pinion gear 55 engages gear teeth 23 of spur gear sector 22 and, of course, is rotated upon movement of spur sector 22 a manner similar to that previously described.

It is possible to provide a third form of scoop substantially, as shown in FIG. 9. Scoop 56 is provided with cup 57 and is similarly adapted to fit over and lock on boss 3. Instead of maintaining a true hemispherical shape, cup 57 could be considered a hemisphere with the center of its outwardly presented surface depressed. Dipper blade 58 possessing a "lazy W" shape fits within cup 56 and sweeps the inwardly present surface thereof in a manner similar to the operation of blade 36. Blade 58, of course, is locked to pinion gear 59, which is operatively secured within the scoop structure and engages gear teeth 23 spur gear sector 22 in a manner similar to that previously described.

One can readily observe that the ice cream scoop can be manufactured in an infinite variety of decorative configurations and sizes for dispensing table sized portions of bulk food products.

It should be understood that changes and modifications in the form, construction, and combination of the several parts of the ice cream dipper set may be made and substituted for those herein shown without departing from the nature and principle of my invention.

Having thus described my invention, what I claim and desire to secure by Letters Patent is:

1. A dipper for dispensing table sized portions of foods prepared in bulk quantities; said dipper comprising a handle, a boss provided on one end of said handle, a scoop provided with a cup, said cup having a hollow channel portion, said boss being telescopically received within said channel portion, said boss and said channel portion having registering openings, a detachable locking member extending through said openings, and means for urging said locking member in locked condition, a blade operatively mounted in said scoop for wiping the inwardly presented surface thereof, said blade being pivoted in the center of the cup of said scoop, and a means for rotating said blade about its pivot point.

2. A dipper for dispensing table-sized portions of food prepared in bulk quantities as defined in claim 1 and further characterized by said boss and said channel portion being of tubular form, the outer cross-section of said boss being substantially the same as the inner cross-section of said channel portion for telescopic reception of the former within the latter.

3. A dipper for dispensing table-sized portions of food prepared in bulk quantities as defined in claim 1 and further characterized by said boss and said channel portion being of four-sided tubular form, each having a top wall, a bottom wall, and a pair of side walls, said top and bottom walls of said boss being provided with aligned apertures, said channel top wall having a recess, said channel bottom wall having an aperture aligned with said recess, said channel portion being dimensioned for telescopically receiving said boss whereby the outer face of the boss walls will abut against the inner face of the corresponding channel portion walls with the aperture in the channel portion bottom wall being in registration with the aperture in the boss bottom wall and the recess in said channel portion top wall being in registration with the aperture in the boss top wall when the dipper is in operative position, said locking member extending through said apertures and recess.

4. A dipper for dispensing table-sized portions of food prepared in bulk quantities as defined in claim 3 and further characterized by said locking member comprising a flat top plate, a cylindrical shank member secured at its upper end to the under face of said top plate in perpendicular relationship thereto, said shank being provided with an annular groove spacedly from its lower, free end, said shank extending through said aligned apertures and recess for projection beyond the channel portion bottom wall, said means for urging said locking member being resilient and being received within said groove for biasing said locking member downwardly into locking said boss and channel portion together.

5. A dipper for dispensing table-sized portions of food prepared in bulk quantities as defined in claim 4 and further characterized by said resilient means comprising a U-shaped spring member having a pair of substantially parallel, upper and lower flat legs, each of said legs having a notch in the free end thereof, the notch in said upper leg receiving the shank of said locking member and the notch in said other leg receiving the grooved portion of said shank for biasing said locking member downwardly into locked condition.

6. A dipper for dispensing table-sized portions of food prepared in bulk quantities as defined in claim 5 and further characterized by said top channel wall recess having portions complementary to portions of the contour of the top plate of the locking member whereby upon downward urging of said locking member the said top plate will be received within said complementary recess portions for restraint against inadvertent shifting.

References Cited

UNITED STATES PATENTS

| | | | |
|---|---|---|---|
| 626,468 | 6/1899 | Schmits | 107—48 |
| 714,440 | 11/1902 | Bolland | 107—49 |
| 833,620 | 10/1906 | Nielsen | 107—48 |
| 2,714,862 | 8/1955 | Gargano | 107—48 |
| 2,761,399 | 9/1956 | Gordon | 107—48 |
| 2,836,132 | 5/1958 | Myers | 107—48 |

WILLIAM I. PRICE, *Primary Examiner.*